(12) United States Patent
Goleski et al.

(10) Patent No.: US 9,022,894 B2
(45) Date of Patent: May 5, 2015

(54) AUTOMATIC TRANSMISSION ASSEMBLY

(71) Applicant: Ford Global Technologies, LLC, Dearborn, MI (US)

(72) Inventors: Gregory D. Goleski, Rochester Hills, MI (US); Steven G. Thomas, Bloomfield Hills, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 13/658,041

(22) Filed: Oct. 23, 2012

(65) Prior Publication Data

US 2014/0113762 A1    Apr. 24, 2014

(51) Int. Cl.
*F16H 61/686* (2006.01)
*F16H 61/02* (2006.01)
*F16D 48/02* (2006.01)
*F16D 25/0638* (2006.01)
*F16H 3/66* (2006.01)
*F16D 25/10* (2006.01)
*F16H 63/30* (2006.01)
*F16H 57/023* (2012.01)
*F16H 3/44* (2006.01)
*F16H 57/08* (2006.01)

(52) U.S. Cl.
CPC ....... *F16D 48/0206* (2013.01); *Y10T 74/19637* (2015.01); *F16H 61/0206* (2013.01); *F16H 2200/203* (2013.01); *F16D 25/0638* (2013.01); *F16H 61/686* (2013.01); *F16H 3/66* (2013.01); *F16H 57/023* (2013.01); *F16D 25/10* (2013.01); *F16H 63/3026* (2013.01); *F16H 2003/447* (2013.01); *F16H 2057/087* (2013.01); *F16H 2200/2012* (2013.01); *F16H 2200/2046* (2013.01)

(58) Field of Classification Search
CPC .............. F16H 61/686; F16H 61/0206; F16H 2200/203
USPC .......................................... 475/279, 116–124
See application file for complete search history.

(56) References Cited

U.S. PATENT DOCUMENTS

| | | | | |
|---|---|---|---|---|
| 6,139,463 | A * | 10/2000 | Kasuya et al. | 475/275 |
| 7,025,703 | B2 * | 4/2006 | Diosi et al. | 475/276 |
| 7,083,537 | B2 * | 8/2006 | Knowles et al. | 475/116 |
| 7,140,997 | B2 * | 11/2006 | Tiesler et al. | 475/278 |
| 7,364,527 | B2 * | 4/2008 | Klemen | 475/290 |
| 2012/0217119 | A1 * | 8/2012 | Janson et al. | 192/85.01 |
| 2012/0279327 | A1 * | 11/2012 | Janson et al. | 74/15.82 |

\* cited by examiner

*Primary Examiner* — Tisha Lewis
(74) *Attorney, Agent, or Firm* — James Dottavio; MacMillan, Sobanski & Todd, LLC

(57) ABSTRACT

A transmission includes gearsets each including rotating members, a support held against rotation, brake servos located in the support, brakes each actuated by one of the brake servos for producing a connection between the support and a respective gearset member, a housing, clutch servos located in the housing, and clutches each actuated by one of the clutch servos for producing a drive connection between the housing and a respective gearset member.

21 Claims, 3 Drawing Sheets

AUTOMATIC TRANSMISSION ASSEMBLY

BACKGROUND OF THE INVENTION

1. Field of the Invention

This invention relates generally to an automatic transmission, in which a clutch module contains clutch servo pistons and a pump support contains brake servo pistons.

2. Description of the Prior Art

In the kinematic arrangement of an automatic transmission, certain control elements, such as hydraulically-actuated clutches, have no fixed connection to any other transmission lever component.

In such cases, a need exists for a technique that simplifies the feed circuit to those clutches, i.e. pressure feeds for each clutch-apply circuit and respective feeds to balance volumes.

In a hydraulically-actuated automatic transmission for a motor vehicle, transmission brakes produce high drag losses, which adversely affect fuel economy.

When the brake's separator plates are splined directly to the transmission case, automatic transmission fluid in the case is difficult to evacuate, which leads to high drag. When the brake's separator plates are splined directly to the transmission case, installation of the separator plates and friction plates must be completed as a final assembly, instead of as a subassembly, which is preferred.

Forming spline teeth in the transmission case that engage spline teeth on the brake's separator plates can be costly to machine and produces excessive, unwanted scrap.

SUMMARY OF THE INVENTION

A transmission includes gearsets each including rotating members, a support held against rotation, brake servos located in the support, brakes each actuated by one of the brake servos for producing a connection between the support and a respective gearset member, a housing, clutch servos located in the housing, and clutches each actuated by one of the clutch servos for producing a drive connection between the housing and a respective gearset member.

The transmission provides an optimized location for all the brakes, clutches and gearsets. It enables three of the rotating clutches to be housed in the same component, two of the clutches being stacked radially to minimize axial length. The brake pistons are housed in the front support to reduce housing cost and length.

The input shaft is formed with four axial feed passages, three passages for each of three clutch-apply circuits and one passage for supplying the balance volumes. One of the passages in the input shaft is multiplexed and used also to feed the rearmost clutch from the rear.

The transmission has a minimum number of splines formed in the transmission case.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
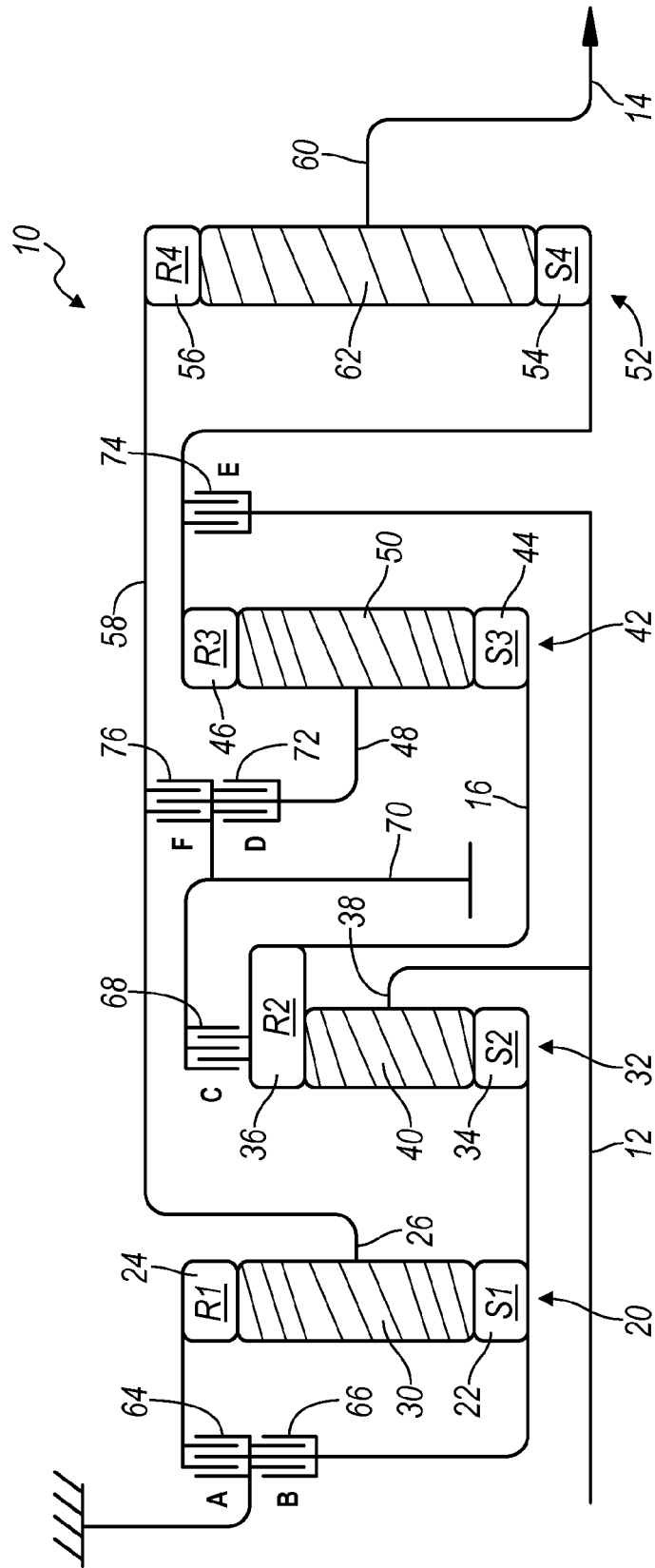
FIG. 1 is a schematic diagram of the kinematic assembly of an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
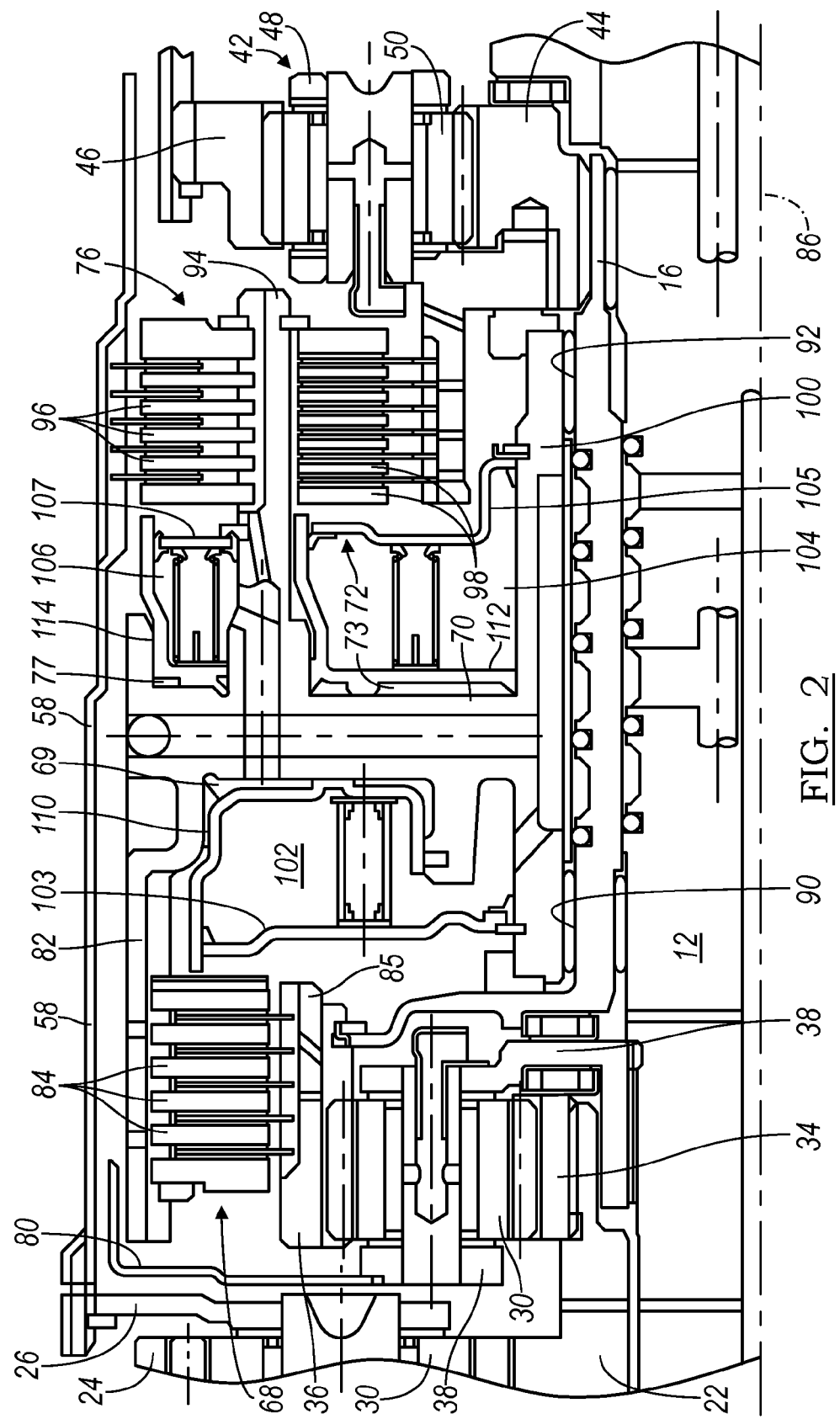
FIG. 2 is a cross sectional side view of an intermediate length portion of the kinematic assembly of FIG. 1 showing a clutch housing.

FIG. 2 shows that carrier 26 is secured to shell 58.

Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on a shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance dam oil feed supplies automatic transmission fluid (ATF), a hydraulic fluid, to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders of clutches 68, 72, 76 is supplied with actuating pressure through individual circuits formed in the clutch housing 70 and communicating with fluid passages formed in the input shaft 12. When no actuating pressure is applied to clutches 68, 72, 76, the clutch housing 70 has no fixed connection to any other component of assembly 10.

Figure 3:
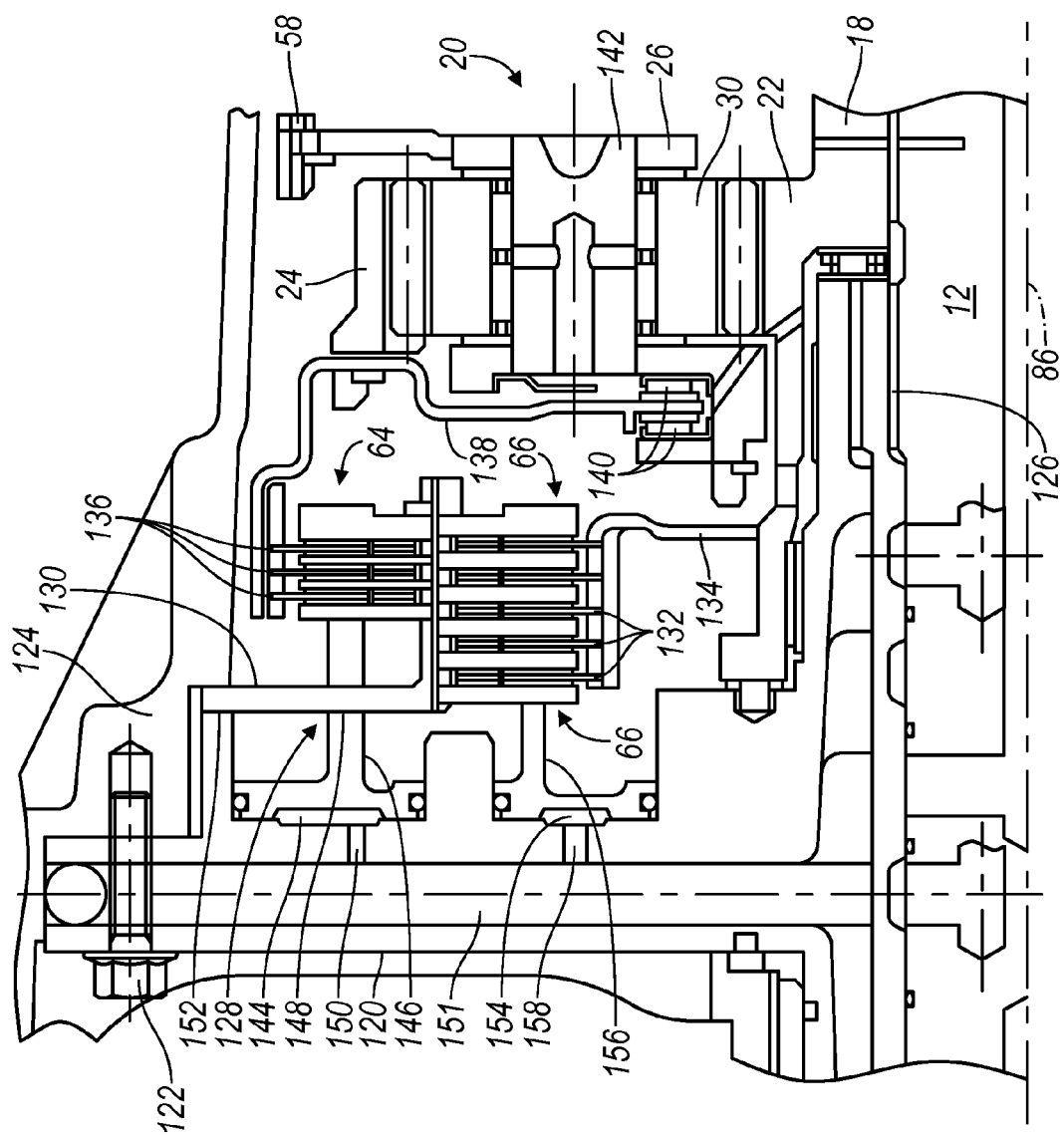
FIG. 3 is a cross sectional side view of a front length portion of the kinematic assembly of FIG. 1 showing a brake assembly.

FIG. 3 shows a pump support 120 secured by bolts 122 to the transmission case 124 and supporting the input shaft 12 on a bushing 126. A hub 128 for brakes 64, 66 includes a radial arm 130, secured to the pump support, and an axial arm formed with external and internal axial splines, to which the spacer plates of brakes 64, 66 are secured, respectively.

The friction discs 132 of brake 66 are connected to external, axial spline teeth formed on a disc 134, which is secured to the sun gears 22, 34 through intermediate shaft 18. The friction discs 136 of brake 64 are connected to internal, axial spline teeth formed on a disc 138, which is secured to ring gear 24 and is supported between two thrust bearings 140 located on the carrier 26.

The planet pinions 30 of gearset 20 are supported for rotation on a pinion shaft 142, which is supported on carrier 26.

Pump support 120 is formed with a first cylinder 144 containing a piston 146, which extends though openings 148 into contact with one of the spacer plates of brake 64. Brake-apply pressure is carried through passages 150, 151 to cylinder 144. The openings 148 in hub arm 130 allow an assembler of the brake hub assembly to see though the arm while aligning friction plates 136 with disc 138.

Support 120 is also formed with a second cylinder 154 containing a piston 156, which contacts one of the spacer plates of brake 66. Brake-apply pressure is carried through passage 158 to cylinder 154.

The radial arm 130 of the brake hub 128 is secured to the transmission case 124 such that the arm contacts an axial stop 152, which limits axial displacement of the arm and provides an axial reaction force to the force of piston 146 applied to the plates of brake 64 and the force of piston 156 applied to the plates of brake 66.

In accordance with the provisions of the patent statutes, the preferred embodiment has been described. However, it should be noted that the alternate embodiments can be practiced otherwise than as specifically illustrated and described.

The invention claimed is:

1. A transmission, comprising:
   gearsets, each gearset including rotating members;
   a support held against rotation;
   brake servos located in the support;
   brakes, each brake actuated by one of the brake servos for producing a connection between the support and a respective gearset member;
   a housing;
   clutch servos located in the housing;
   clutches, each clutch actuated by one of the clutch servos for producing a drive connection between the housing and a respective gearset member; and
   wherein the gearsets further comprise a first planetary gearset including a first ring gear and a first sun gear; and the brakes further comprise a first brake for releaseably holding the first ring gear against rotation, and a second brake for releaseably holding the first sun gear against rotation.

2. The transmission of claim 1, further comprising:
   a case fixed against displacement; and
   wherein the support is secured to the case and formed with brake servo cylinders, each cylinder containing a piston for actuating one of the brakes.

3. The transmission of claim 1, further comprising:
   a brake hub secured to the support;
   each of the brakes including plates connected to the brake hub.

4. The transmission of claim 1, wherein the housing is formed with clutch servo cylinders, each cylinder containing a piston for actuating one of the clutches.

5. The transmission of claim 1, wherein:
   the gearsets further include a second planetary gearset including a second ring gear, a second sun gear, a second carrier and second pinions supported on the carrier and engaged with the second ring gear and the second sun gear; and
   the clutches further include a first clutch for producing a drive connection between the housing and the second ring gear.

6. The transmission of claim 1, wherein:
   the gearsets further include an additional planetary gearset including an additional ring gear, an additional sun gear, an additional carrier and additional pinions supported on the additional carrier and engaged with the additional ring gear and the additional sun gear; and
   the clutches further include an engageable clutch for producing a drive connection between the additional carrier and the housing.

7. The transmission of claim 1, further comprising:
   a shell connecting a carrier of the first planetary gearset and an additional ring gear of an additional planetary gearset; and
   wherein the clutches further include an engageable clutch for producing a drive connection between the housing and the shell.

8. The transmission of claim 1, wherein:
   the first planetary gearset includes the first ring gear, the first sun gear, a first carrier and first pinions supported on the first carrier and engaged with the first ring gear and the first sun gear; and the gearsets further include an additional planetary gearset including an additional ring gear, an additional sun gear, an additional carrier and additional pinions supported on the additional carrier and engaged with the additional ring gear and the additional sun gear; and
   further comprising:
   a shell connecting the first carrier of the first planetary gearset and the additional ring gear of the additional planetary gearset; and
   the clutches further include an engageable clutch for producing a drive connection between the housing and the shell.

9. The transmission of claim 1, wherein each of the clutch servos comprises:
   a cylinder located in the housing;
   a piston located in the cylinder;
   a balance dam supported on the housing and defining a balance volume; and
   a spring urging the piston away from the balance dam.

10. A transmission, comprising:
    gearsets, each gearset including rotating members;

a support fixed against displacement and formed with brake-apply fluid passages;

brake servos located in the support supplied with fluid through the passages;

brakes, each brake actuated by one of the brake servos and producing a connection between the support and a respective gearset member;

a housing formed with clutch-apply fluid passages;

clutch servos located in the housing;

clutches, each clutch actuated through one of the clutch-apply passages and one of the clutch servos to produce a drive connection between the housing and a respective gearset member.

11. The transmission of claim 10, further comprising an input shaft rotatably supporting the housing and including fluid passages communicating with the clutch apply passages.

12. The transmission of claim 10, further comprising:
a case fixed against displacement; and
wherein the support is secured to the case and formed with brake servo cylinders, each cylinder containing a piston for actuating one of the brakes.

13. The transmission of claim 10, further comprising:
a brake hub secured to the support;
each of the brakes including plates connected to the brake hub.

14. The transmission of claim 10, wherein:
the gearsets further comprise a first planetary gearset including a ring gear and a sun gear; and
the brakes further comprise a first brake for releaseably holding the ring gear against rotation, and a second brake for releaseably holding the sun gear against rotation.

15. The transmission of claim 10, wherein the housing is formed with clutch servo cylinders, each cylinder containing a piston for actuating one of the clutches.

16. The transmission of claim 10, wherein:
the gearsets further include a second planetary gearset including a second ring gear, a second sun gear, a carrier and pinions supported on the carrier and engaged with the second ring gear and the second sun gear; and
the clutches further include a first clutch for producing a drive connection between the housing and the second ring gear.

17. The transmission of claim 10, wherein:
the gearsets further include a third planetary gearset including a third ring gear, a third sun gear, a third carrier and third pinions supported on the carrier and engaged with the third ring gear and the third sun gear; and
the clutches further include a second clutch for producing a drive connection between the third carrier and the housing.

18. The transmission of claim 10, further comprising:
a shell connecting the carrier of a first planetary gearset and a ring gear of a fourth planetary gearset; and
wherein the clutches further include a third clutch for producing a drive connection between the housing and shell.

19. The transmission of claim 10, wherein each of the clutch servo comprises:
a cylinder located in the housing;
a piston located in the cylinder;
a balance dam supported on the housing and defining a balance volume; and
a spring urging the piston away from the balance dam.

20. A transmission, comprising:
gearsets, each gearset including rotating members, the gearsets including a first planetary gearset and an additional planetary gearset;
a support held against rotation;
brake servos located in the support;
brakes, each brake actuated by one of the brake servos for producing a connection between the support and a respective gearset member;
a housing;
clutch servos located in the housing;
clutches, each clutch actuated by one of the clutch servos for producing a drive connection between the housing and a respective gearset member;
a shell connecting a carrier of the first planetary gearset and a ring gear of the additional planetary gearset; and
wherein the clutches include an engageable clutch for producing a drive connection between the housing and the shell.

21. A transmission, comprising:
gearsets, each gearset including rotating members;
a support held against rotation;
brake servos located in the support;
brakes, each brake actuated by one of the brake servos for producing a connection between the support and a respective gearset member;
a housing;
clutch servos located in the housing;
clutches, each clutch actuated by one of the clutch servos for producing a drive connection between the housing and a respective gearset member;
wherein the gearsets include a first planetary gearset including a first ring gear, a first sun gear, a first carrier and first pinions supported on the first carrier and engaged with the first ring gear and the first sun gear; and
an additional planetary gearset including an additional ring gear, an additional sun gear, an additional carrier and additional pinions supported on the additional carrier and engaged with the additional ring gear and the additional sun gear; and
further comprising:
a shell connecting the first carrier of the first planetary gearset and the additional ring gear of the additional planetary gearset; and
the clutches include an engageable clutch for producing a drive connection between the housing and the shell.

* * * * *